United States Patent
Shin et al.

(10) Patent No.: US 7,352,965 B2
(45) Date of Patent: Apr. 1, 2008

(54) DIGITAL PHOTOGRAPHIC DEVICE

(75) Inventors: Kazunobu Shin, Frisco, TX (US); Hiroshi Sasaki, Kawasaki (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/317,446

(22) Filed: Dec. 23, 2005

(65) Prior Publication Data

US 2006/0244835 A1    Nov. 2, 2006

Related U.S. Application Data

(63) Continuation of application No. PCT/JP03/08242, filed on Jun. 27, 2003.

(51) Int. Cl.
G03B 29/00    (2006.01)
H04N 5/225    (2006.01)

(52) U.S. Cl. .................................. 396/429; 348/207.99

(58) Field of Classification Search ................. 396/429, 396/297, 300, 439; 348/14.02, 207.99, 207.1
See application file for complete search history.

(56) References Cited

U.S. PATENT DOCUMENTS 5,699,277 A * 12/1997 Munson et al. ............. 715/725

| | | | |
|---|---|---|---|
| 6,690,417 B1 | 2/2004 | Yoshida et al. | 348/231.1 |
| 2002/0067924 A1* | 6/2002 | Yamazaki et al. | 396/429 |
| 2005/0012811 A1* | 1/2005 | Nakagawa et al. | 348/14.02 |
| 2005/0068421 A1* | 3/2005 | Dutta et al. | 348/207.99 |
| 2005/0231598 A1* | 10/2005 | Dutta et al. | 348/207.99 |
| 2006/0158682 A1* | 7/2006 | Atsumi et al. | 358/1.15 |

FOREIGN PATENT DOCUMENTS

JP    10-084522    3/1998

* cited by examiner

*Primary Examiner*—W. B. Perkey
(74) *Attorney, Agent, or Firm*—Harrington & Smith, PC

(57) ABSTRACT

This device includes a camera, a host module, an interface part, and a chassis, wherein the host module has a host CPU that is connected to the interface, the camera module has a register that is provided with a first area and a second area distinguished from the first area depending on the address, and a camera CPU that receives the interruption when the data is written in the first area, the host CPU prepares a type of data and writes it in the first area, the camera CPU prepares dual data that correspond to the written type of data and writes it in the second area, and the host CPU can directly read the data from the second area while designating the address of the second area and further, the host CPU can directly write the data in the second area while designating the address of the second area.

20 Claims, 3 Drawing Sheets

DIGITAL PHOTOGRAPHIC DEVICE

RELATED APPLICATION

This application is a U.S. Continuation Application under 35 USC 371 of International Application PCT/JP2003/008242 filed 27 Jun. 2003.

BACKGROUND OF THE INVENTION

1. Field of the Invention

The present invention relates to a digital photographic device that is configured by a camera module and a host module, and particularly, the invention relates to the structure for effectively exchanging the control data between the host module and the camera module and the structure for conducting a hardware test and a software test of the camera module.

2. Description of the Related Art

In recent years, there are many occasions that a camera is incorporated in a portable information device such as a cellular phone and a PDA. In such a camera-equipped cellular phone, a camera portion is frequently manufactured as an independent camera module although this camera-equipped cellular phone has a chassis covering the entire device and the camera portion is barely visible, because by making the camera portion into a module, the same module can be easily combined to various different cellular phone and PDA. In addition, since a mass production can be expected, reduction of a manufacturing cost can be also expected. Accordingly, it can be understood that such a camera-equipped information device is configured by a host module controlling a telephone function and a PDA function and a camera module controlling a camera function and two modules are connected each other by an interface. The camera module is provided with an image pickup device of converting a light into an electronic signal, a LED lighting, and an image data construction part of constructing the image data that can be displayed by a computer from the output signal of the image pickup device.

In such a camera-equipped information device, it is common that photographing is carried out by using a user interface provided to the host module, so that the host module normally controls the camera function of the camera module. As such a control method, two methods are conceivable.

At first, according to a first method, the IC (the host IC) of the host module directly controls each configuration device of the camera module. In other words, the host IC may directly control timing of data collection by an image pickup device of the camera module, various parameters relevant to the image processing of the image pickup data, and on and off of the LED light or the like. Such a control is carried out in the case that a processing apparatus provided to the host IC is mounted on the IC of the camera module (the camera IC) and this processing apparatus designates an address of a register for controlling that is connected to the image pickup device and directly outputs a control parameter. In the case of the first method, since the control of the camera IC is carried out when the processing apparatus of the host IC designates the address of the register for controlling and outputs the control parameter, the software of the host IC is necessarily changed when a register map of the camera IC is changed or a control parameter is changed in the middle of development. control of the camera IC is carried out when the processing apparatus of the host IC designates the address of the resistor for controlling and outputs the control parameter, the software of the host IC is necessarily changed when a resister map of the camera IC is changed or a control parameter is changed in the middle of development.

According to a second method, the camera IC itself may directly control each configuration device in such a manner that the camera IC is also provided with the processing apparatus composed of the CUP or software, the host IC transmits a message-based command to the camera IC, and the camera IC interprets this message command. For example, if the host IC transmits a message command of "Start photographing" to the camera IC, the camera IC prepares a control parameter of the image pickup device that is necessary for "Start photographing" by its own processing apparatus and outputs the compliant control parameter to a register for control of the image pickup device.

In the case of the second method, the processing apparatus of the host IC cannot access the register for control of the camera IC. In other words, it is very difficult to check the state of the register for control of the camera IC from the external region. Therefore, it is difficult for the camera IC to appropriately interpret the message command of the host IC and check if the register for control is suitably set or not.

In such a case, as a method of examining the state of the register for control, it is conceivable to use a JTAG. The JTAG is a board test method that is standardized in 1990 as an IEEE 1149.1. The IC of supporting the JTAG is provided with a dedicated signal line for inputting and outputting a message command for testing and a result of processing this message command and the external computer may test the IC through this signal line. Accordingly, the camera IC can check the value of the register for control if the camera IC complies with the JTAG. However, in the case of using the JTAG, the camera IC must have a circuit for the JTAG test and an input and output unit and this leads to increase of the cost.

SUMMARY OF THE INVENTION

An object of the invention is to provide a digital photographic device including a camera module for taking a picture and creating the image data; a host module for saving the image data; an interface part for connecting the camera module to the host module; and a chassis for integrally holding the camera module, the host module, and the interface part; wherein the host module has a host CPU that is connected to the interface; the camera module has a register that is connected to the interface part and is provided with a first area and a second area distinguished from the first area depending on the address, and a camera CPU that is connected to the register and receives the interruption when the data is written in the first area; the host CPU prepares a type of data and writes the type of data in the first area through the interface part; the camera CPU prepares dual data that correspond to the written type of data and writes the dual data in the second area; and the host CPU can directly read the data from the second area through the interface while designating the address of the second area and further, the host CPU can directly write the data in the second area through the interface while designating the address of the second area.

In the digital photographic device, it is preferable the type of data is a message command indicating a predetermined function. It is preferable that the dual data are control parameters of hardware. Further, the digital photographic device can be configured in such a manner that the camera module may comprise a solid-state image pickup device and the dual data are control parameters of the solid-state image pickup device. Moreover, the digital photographic device can be configured in such a manner that the camera module may comprise a lighting system and the dual data are control parameters of the lighting system. Still further, the digital photographic device can be configured in such a manner that the camera module may comprise a plurality of lenses and a motor for moving at least one lens among the plurality of lenses and the dual data are control parameters of the motor. Further, in the digital photographic device, it is preferable that the host module has a telephone function.

DETAILED DESCRIPTION OF THE INVENTION

Hereinafter, an embodiment that the invention is applied to a camera-equipped cellular phone will be described below with reference to the drawings.

Figure 1:
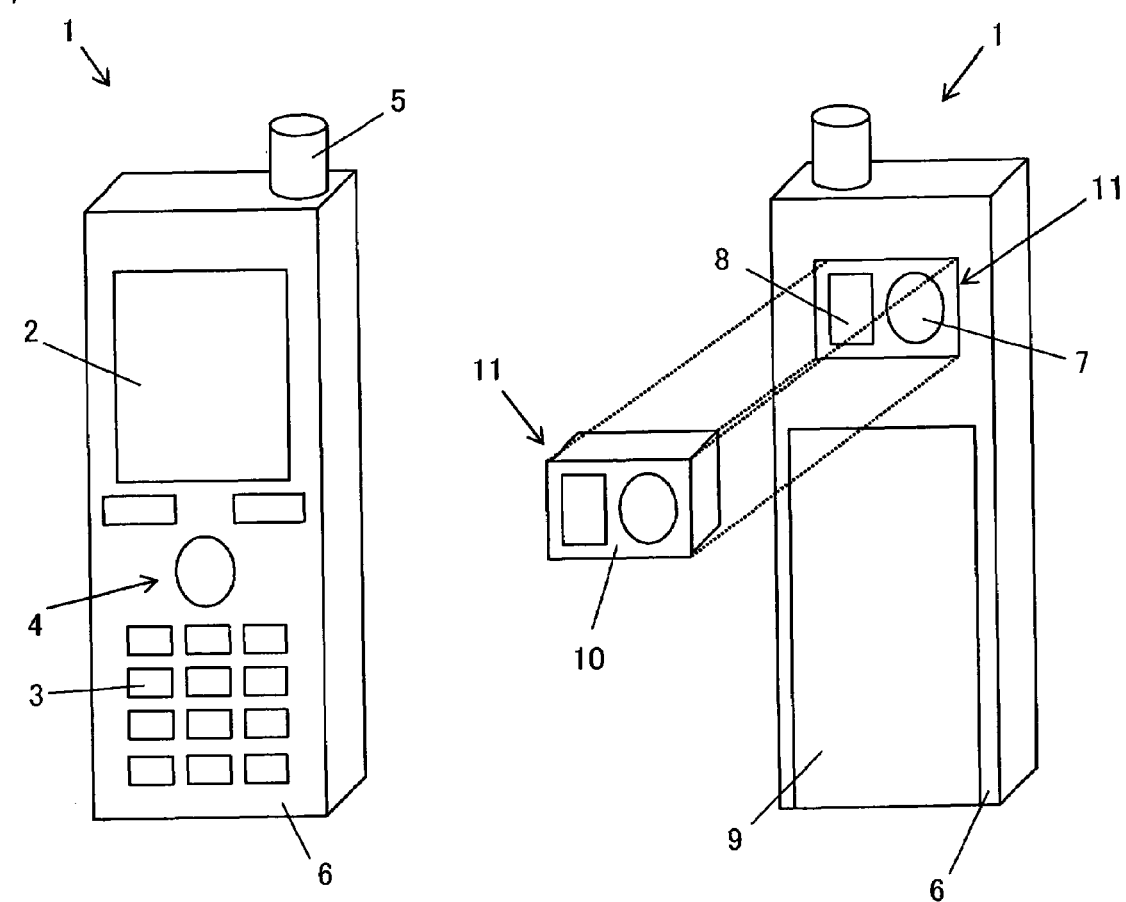
FIG. 1 is an external view of a camera-equipped cellular phone to which the invention is applied.

FIG. 1 is an external view of a camera-equipped cellular phone to which the invention is applied. A camera-equipped cellular phone 1 is provided with a display 2, a numeric keypad 3, a functional button 4, and an antenna 5 or the like on its front surface; the camera-equipped cellular phone 1 is provided with a camera portion 11 and a buttery cover 9 or the like on its rear surface; and further, the camera-equipped cellular phone 1 is provided with a chassis 6 for integrally holding these parts. As well known, the size and the weight of the camera-equipped cellular phone 1 are very small, so that it is not inconvenient to hold the camera-equipped cellular phone 1 by one hand or to carry it in the handbag. The camera portion 11 is configured as a camera module provided with a lens 7, an LED light 8, and an independent chassis 10. Thus, the camera portion is made as the independent module because a general versatility is given to the camera module so as to be easily combined with the other cellular phone and the other PDA. As a result, the camera-equipped cellular phone 1 can be divided into the camera module 11 and the other remaining portion (a host module).

The functional button 4 is used upon sending and receiving telephone calls and as a shutter button upon taking a picture. In the case of making a call by using the camera-equipped cellular phone 1, a user may input a telephone number from the numeric keypad 3 and press the functional button 4. In addition, in the case of taking a picture, the user may have the camera-equipped cellular phone 1 with the lens 7 directed to the target and may check a preview image that is photographed by the camera module 11 on the display 2. Therefore, if the user presses the functional button 4, the photographing is carried out and the image data created by the photographing is saved in a recording unit provided to the camera-equipped cellular phone 1.

Figure 2:
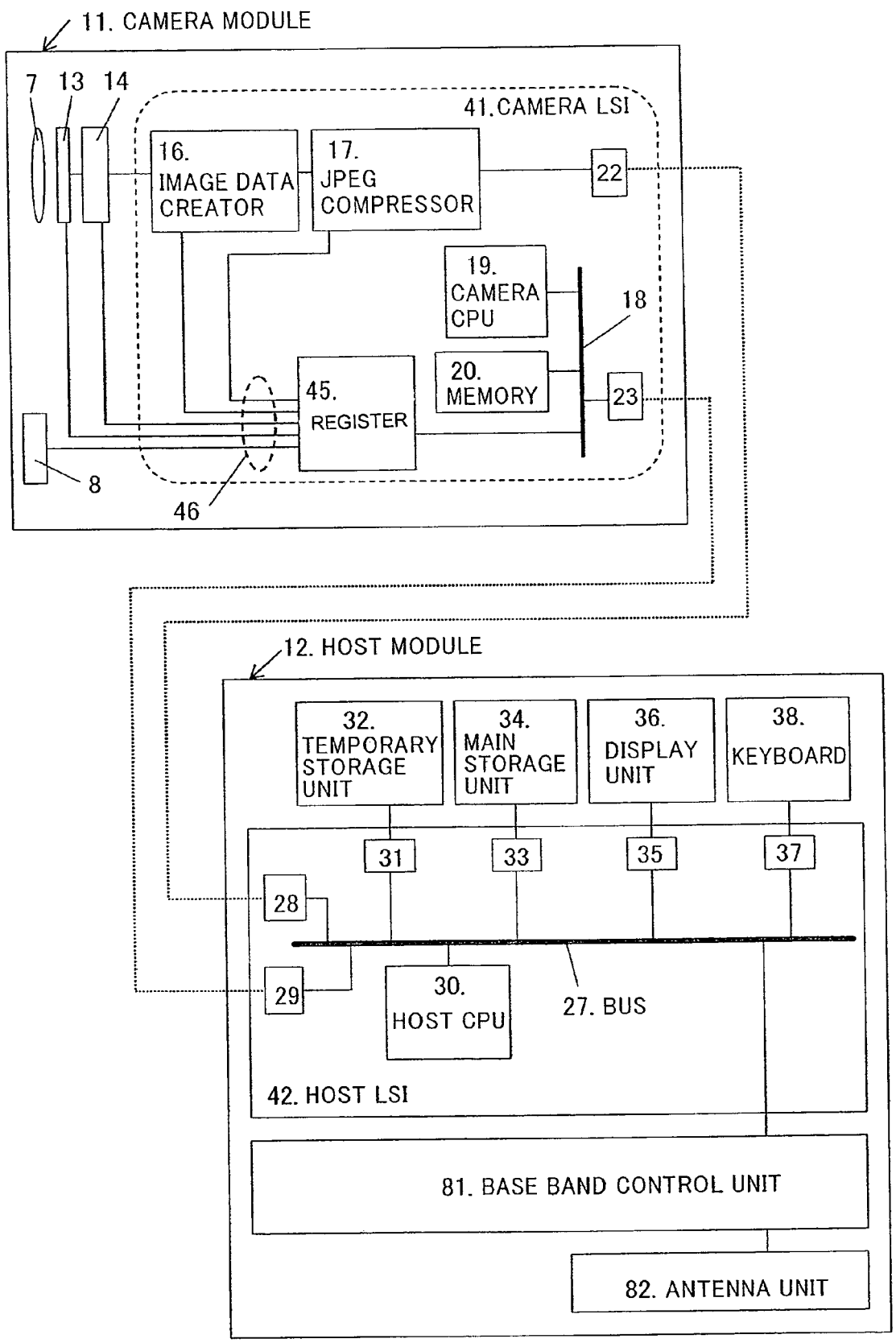
FIG. 2 is a block diagram of hardware of the camera-equipped cellular phone to which the invention is applied.

With reference to FIG. 2, the configuration and the operation of the hardware of the camera-equipped cellular phone to which the invention is applied will be described below. As described above, the camera-equipped cellular phone 1 is configured by the camera module 1 and a host module 12, the camera module 11 may handle the photographing and creation of the image data, and the host module 12 may handle the PDA function such as the telephone function and the schedule function other than saving and display of the created image data.

The camera module 11 is provided with the lens 7, the LED light 8, a solid-state image pickup device 13, an A/D converter 14, an image data creator 16, a JPEG compressor 17, a bus 18, a data interface 22, and a control interface 23 or the like. To the bus 18, a camera CPU 19, a memory 20, and a register 45 or the like are connected and a control interface 23 is also connected to the bus 18. From a register 45, a control line 46 is extended to each of hardware composing the camera module such as the solid-state image pickup device 13, the A/D converter 14, and the image data creator 16. The hardware other than the lens 7, the LED light 8, the solid-state image pickup device 13, and the A/D converter 14 is provided in one chip as a camera LSI 41.

The host module 12 is provided with a data interface 28, a control interface 29, a host CPU 30, an interface for a temporary storage unit 31, a temporary storage unit 32, an interface for a main storage unit 33, a main storage unit 34, an interface for a display unit 35, a display unit 36, an interface for a keyboard 37, and a keyboard 38 or the like and these parts are connected to each other through a bus 27. In addition, the host CPU 30, the bus 27, the interfaces 28, 29, 31, 33, 35, and 37 are provided in one chip as a host LSI 42. Other than these, the host module 12 is provided with a base band controlling unit 81 and an antenna unit 82 or the like. The base band controlling unit 81 may handle the function for sending and receiving of a telephone call and may have a dedicated CPU. The host LSI 42 may handle the functions other than the function for sending and receiving of a telephone call and may also handle the functions of the control of the keyboard 38, a game, reproduction of music, and a schedule or the like. In the meantime, the keyboard 38 may include the numeric keypad 3 and the functional button 4 or the like.

As the solid-state image pickup device 13 of the camera module 11, for example, a CCD and a CMOS sensor or the like can be used. The solid-state image pickup device 13 may carry out the photographing by converting the light passed through the lens 7 into an electric signal. The output signal of the solid-state image pickup device 13 is converted into the digital data by the A/D converter 14. This digital data is called as the RAW data, however, this digital data has not been the image data yet, which can be displayed by a computer or can be printed by a printer. The image data is created by the image data creator 16. At first, the image data creator 16 may perform the original image processing to the RAW data such as a lens shading correction and a white balance or the like. Next, extracting the components such as red (R), green (G), and blue (B) from the RAW data to which the original image processing is applied and applying the CFA (Color Filter Array) interpolation processing, the image data of an RGB formation composed of an RGB 3 plane is created. Further, with respect to this image data, the processing such as intensity of an outline and a gamma correction or the like is carried out. At last, the format of the image data is converted from the RGB format into a YUV format. The image data composing one frame is sequentially created for each line or for each several lines to be sequentially outputted to the JPEG compressor 17 by the amount of the created data. Finally, from the output signal of the solid-state image pickup device 13 acquired by the photographing for one time, the image data of the entire one frame are created. The created image data is transmitted to the host module 12 via the interfaces 22 and 28.

At first, the image data received by the host module is temporarily saved in the temporary storage unit 32. A typical storage unit used as the temporary storage unit 32 is a SDRAM. If the received image data is the image data for preview, the host CPU 30 may read this data from the temporary storage unit 32, then, it may perform certain processing, and it may display it on the display screen of the display unit 36. If the received data is the image data for saving, the host CPU 30 may read this image data for saving from the temporary storage unit 32 and may save it in the main storage unit 34. The main storage unit 34 is provided with a recording medium continuously saving the data even if the power source of the camera-equipped cellular phone 1 is powered off and for example, a flush memory, a CF card, and a SD card can be used. In the meantime, if the image data is that for saving, the camera module 11 compresses this image data by the JPEG compressor 17 in advance and then, the camera module 11 outputs the compressed image data to the camera module through the data interface 22.

Figure 3:
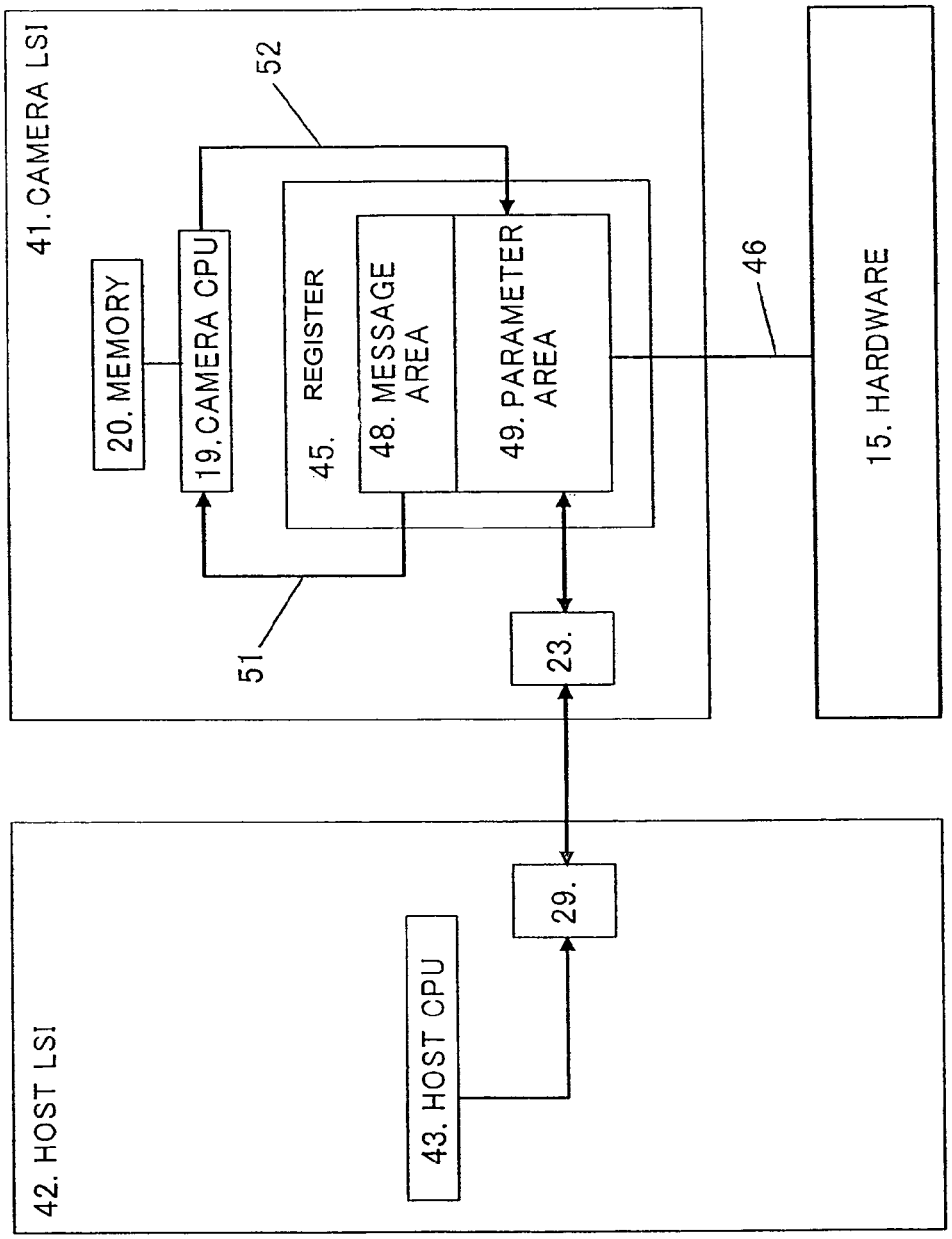
FIG. 3 is a view typically illustrating the control of a camera module by a host LSI.

Next, the structure and the operation regarding control of each of hardware of the camera module 11 will be described in detail with reference to FIG. 3. As shown in FIG. 3, the register 45 of the camera LSI 41 is provided with a message area 48 and a parameter area 49. The message area 48 is an area for writing a message command therein. The message command serves to command the execution of a specific function, for example, "Take a picture" and "Light an LED light", and however, the message command does not serve to directly change the state of the hardware. The parameter area 49 is an area for writing a control parameter therein. If the control parameter is written in a certain area of the parameter area 49, the state of the hardware corresponding to this area is directly changed. For example, the LED light 8 may be lighted and the solid-state image pickup device 13 may be made into an exposure mode.

The message area 48 and the parameter area 49 are distinguished by their addresses. The host CPU 43 is configured so that it can write the message command while accessing the message area 48 by designating the proper address and further, it can read and write the control parameter while accessing the parameter area 49. The host CPU 43 can read and write the data while directly accessing the message area 48 and the parameter area 49. The camera CPU 19 is configured so that it can read the content of the message area 48 and can write the control parameter in the parameter area 49 by designating the proper address.

The camera LSI 41 is configured so that an interruption is generated in the camera CPU 19 when the message area 48 of the register 45 receives writing (a cited number 51). In addition, the control line 46 is extended to the hardware 15 composing the camera module 11 from the parameter area 49. Here, the hardware 15 is shown in FIG. 3 with the device to specifically realize various functions of the camera module such as the solid-state image pickup device 13, the A/D converter 14, the LED light 8, the image data creator 16, and the JPEG compressor 17 in FIG. 2 omitted. In the same way, in FIG. 3, only one control line 46 is shown in FIG. 3, however, the structure has a control line independently for each hardware in fact as shown in FIG. 2. The parameter area 49 has a dedicated area for each hardware, respectively, and for each dedicated area, the control line 46 is extended to the corresponding hardware (refer to FIG. 2). If the state of the dedicated area in the parameter area 49 is changed, this is introduced to the corresponding hardware through the control line 46 and this hardware may change the state. For example, if the value of the dedicated area in the parameter area 49 corresponding to the LED light 8 is changed, the LED light 8 may be turned on or turned off.

When the host LSI 42 uses the function of the camera module, at first, the host CPU 43 may transmit the message command to call the function to the camera LSI 41. The message command received by the camera LSI 41 is written in the message area 48 of the register 45. The host CPU 43 may directly write the message command into the area having the corresponding address in the message area 48 by designating the address.

Due to writing the message command into the message area 48, the interruption is generated in the camera CPU 19 (the cited number 51). Receiving the interruption by writing the message command into the parameter area 49, the camera CPU 19 may call a message handler corresponding to the written message command from the memory 20. The message handler is mounted as a firm ware of the camera LSI. By the called message handler, the camera CPU 19 may write a plurality of control parameters in the parameter area 49 of the register 45 at programmed time intervals in accordance with the processing corresponding to this message hander (the cited number 52). More specifically, the camera CPU 19 may directly write the plurality of control parameters in the area having the corresponding address in the parameter area 49 at the programmed time intervals in accordance with the processing corresponding to the message handler by designating the address.

If the state of a certain area of the parameter area 49 is changed when a new control parameter is written into the parameter area 49, the information about this change is introduced to the hardware 15 via the control line 46 and then, the state of the hardware corresponding to this area is changed. For example, the solid-state image pickup device 13 is made into a mode of reading the electric signal and for focusing and zoom, a motor for driving a lens (not illustrated) is driven in three steps or the LED light 8 is turned on or turned off.

Next, a method of testing the camera module 41 in the camera-equipped cellular phone 1 according to the invention will be described with reference to FIG. 3. As the test for the camera module 41, a hardware test and a software test are conceivable.

The hardware test serves to check if each hardware of the camera module 41 can perform a predetermined function or not. In order to carry out this test, designating an address by the host CPU 43, a tester directly writes the control parameter of the hardware 15 in a predetermined area of the parameter area 49 of the register 45 of the camera LSI 41, and observes the operation of the hardware 15 after the control parameter is written. For example, in the case of testing a data collection function by the solid-state image pickup device 13, the tester outputs 10000001 designating the address for the part of the solid-state image pickup device 13 of the parameter area 49 by the host CPU 43 and checks if the solid-state image pickup device 13 starts exposure or not. In addition, designating this address and outputting 10010001, the tester checks if the solid-state image pickup device 13 concludes the exposure or not. As this example, it is possible to determine if the hardware of the camera module 11 normally operates by writing the control parameter for a certain function in the parameter area 49 and observing if each of hardware performs the desired operation or not with respect to all functions of each hardware of the camera module 11.

The software test serves to determine if a firmware of the camera LSI normally functions or not. In order to carry out this test, designating the address by the host CPU 43, the tester may write the message command indicating a specific function in the message area 48 of the register 45 of the camera LSI 41. Then, the firmware of the camera LSI may prepare a plurality of hardware control parameters by the camera CPU 19 in accordance with the processing for realizing the function and may write the control parameter in the parameter area 49 of the register 45. Designating the address by the host CPU 43, the tester may access the parameter area 49 of the register 45 and may read the written control parameter. Then, the tester may determine if the written control parameter is a desired value or not. According to the previous example, at first, the tester may write the message command of "Start exposure" in the message area 48 of the register 45 by the host CPU 43. Next, the tester may designate the address of the part for the solid-state image pickup device of the parameter area 49 of the register 45 by the host CPU 43, may read the value of the parameter, and check if this value is 10000001 or not. In addition, in order to test the function of the part for initialization of the camera module of the firmware, the tester may write the message command indicating the initialization of the camera module in the message area 48, and then, the parameter may check if the parameter area 49 takes a value indicating the initialization or not. By performing such a test with respect to the all firmware, it is possible to carry out the test of the firmware.

Thus, the test of the camera module 41 can be carried out without preparation of a separate device for the test. It is obvious that the test of the camera module 41 can be also carried out by using the separate device to shoulder the function of the host LSI in the above description.

The above-described embodiment only relates to an example for putting the invention into practice and it is obvious that various embodiments are available within the range not deviating from the scope of the invention. For example, if the host CPU 43 can discriminate between the message area and the parameter area depending on the address, a plurality of registers 45 is allowed to be mounted in the camera LSI 41.

What is claimed is:

1. A digital photographic device comprising:
    a camera module configured to take a picture and to create image data;
    a host module configured to save said image data;
    an interface part configured to connect said camera module to said host module; and
    a chassis configured to integrally hold said camera module, said host module, and said interface part;
    wherein said host module comprises:
    a host CPU that is connected to said interface part;
    a register that is connected to said interface part and is provided with a first area and a second area distinguished from said first area depending on an address, and
    a camera CPU that is connected to said register and configured to receive an interrupt when the data is written in said first area;
    said host CPU is configured to prepare a type of data and to write said type of data in said first area through said interface part;
    said camera CPU is configured to prepare dual data that correspond to said written type of data and to write said dual data in said second area; and
    said host CPU is configured to directly read the data from said second area through said interface while designating the address of said second area and further, said host CPU is configured to directly write the data in said second area through said interface while designating the address of said second area.

2. The digital photographic device according to claim 1, wherein said type of data is a message command indicating a predetermined function.

3. The digital photographic device according to claim 1, wherein said dual data are control parameters of hardware.

4. The digital photographic device according to claim 1, wherein said camera module comprises a solid-state image pickup device and said dual data are control parameters of said solid-state image pickup device.

5. The digital photographic device according to claim 1, wherein said camera module comprises a lighting system and said dual data are control parameters of said lighting system.

6. The digital photographic device according to claim 1, wherein said camera module comprises a plurality of lenses and a motor configured to move at least one lens among said plurality of lenses and said dual data are control parameters of said motor.

7. The digital photographic device according to claim 1, wherein said host module has a telephone function.

8. A method comprising:
    in response to first data being written to a first area of camera memory, reading the first data; and
    writing dual data, which correspond to the first data, in the second area of camera memory, where the dual data implements a change in at least one camera hardware state.

9. The method according to claim 8, wherein the first data is a message command indicating a predetermined function.

10. The method according to claim 8, wherein the dual data comprise control parameters of camera hardware.

11. The method according to claim 8, wherein the dual data comprise control parameters of at least one of a solid-state image pickup device, a lighting system, and a motor for moving at least one lens.

12. The method according to claim 8, wherein the camera memory is a register.

13. The method according to claim 8, where the camera memory has a message area and a parameter area.

14. The method according to claim 8, further comprising generating an interrupt in response to the first data being written.

15. A camera apparatus, which comprises part of a host apparatus, comprising:
    means for storing data;
    means for reading first data in response to the first data being written to a first area of the storing means;
    means for writing a dual data, which correspond to the first data in a second area of camera memory, where the dual data implements a change in a least one camera hardware state; and
    means for the host apparatus to read the dual data from the second area while designating an address of the second area.

16. The camera apparatus according to claim 15, wherein the first data is a message command indicating a predetermined function.

17. The camera apparatus according to claim 15, wherein the dual data comprise control parameters of camera hardware.

18. The camera apparatus according to claim 15, wherein the dual data comprise control parameters of at least one of a solid-state image pickup device, a lighting system, and a motor for moving at least one lens.

19. The camera apparatus according to claim 15, further comprising means for generating an interrupt in response to the first data being written.

20. The camera apparatus according to claim 15, where the host apparatus comprises a telephone function.

* * * * *